Nov. 23, 1954     M. D. MORGAN     2,695,166
BALANCING ATTACHMENT FOR WEIGHING SCALES
Filed Dec. 16, 1950     2 Sheets-Sheet 1
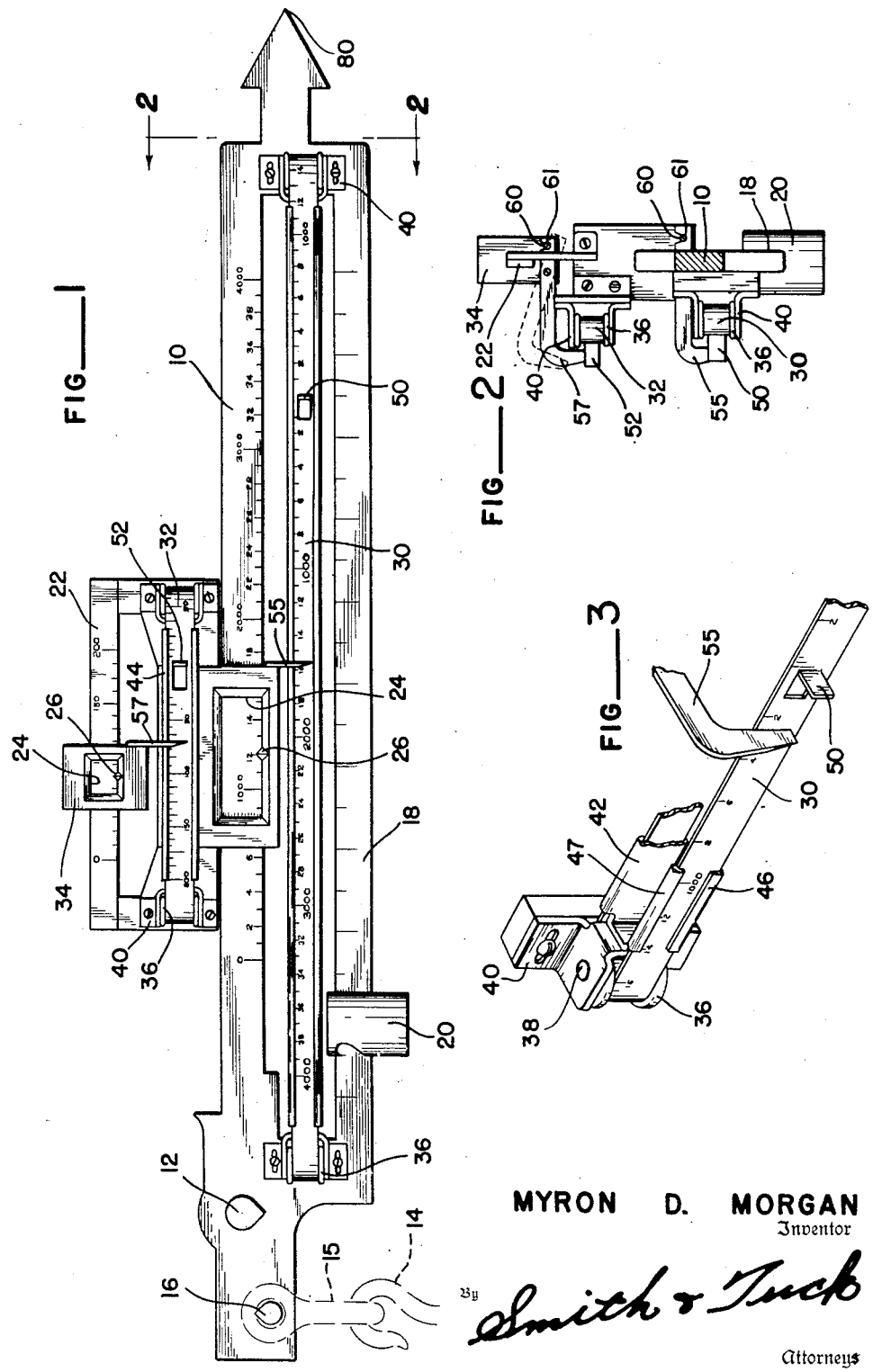
MYRON D. MORGAN
Inventor
By Smith & Tuck
Attorneys Nov. 23, 1954  M. D. MORGAN  2,695,166
BALANCING ATTACHMENT FOR WEIGHING SCALES
Filed Dec. 16, 1950  2 Sheets-Sheet 2
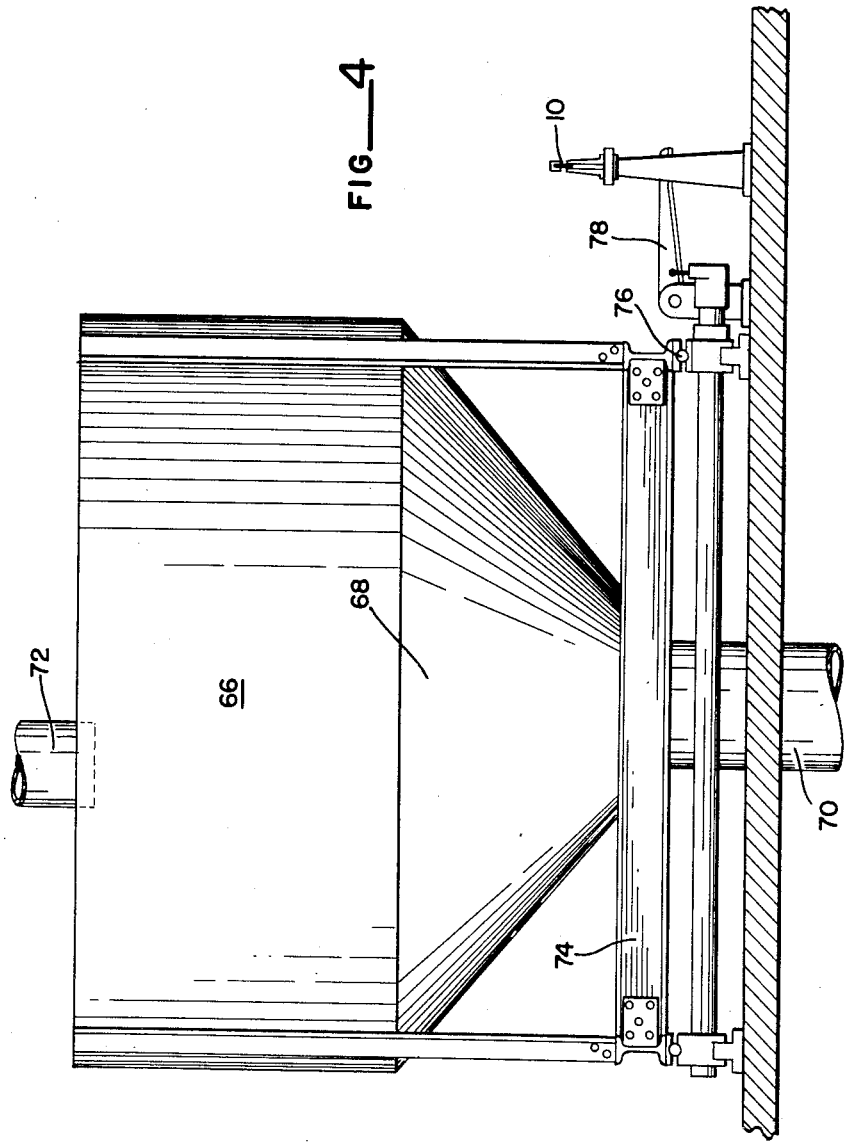
MYRON D. MORGAN
Inventor
By Smith & Tuck
Attorney United States Patent Office 2,695,166
Patented Nov. 23, 1954

2,695,166
BALANCING ATTACHMENT FOR WEIGHING SCALES
Myron D. Morgan, Seattle, Wash.
Application December 16, 1950, Serial No. 201,181
4 Claims. (Cl. 265—56.5)

This present invention is an attachment for balancing scales consisting of one or more inverse tapes which facilitates the re-balancing of a scale after it has been thrown out of balance, either by the addition to, or the subtraction from the given weight of a quantity of the same type of material. In the weighing of batches of material, considerable confusion and error has resulted in the past, due to the fact that the operator must mentally add to, or subtract from, the amount of the main mass being weighed. This is particularly prevalent where weighing must be performed by persons of limited education or who, for one reason or another, do not pay strict attention to the additive or subtractive weights. In the past this difficulty has been recognized, but the arrangements provided for achieving this general end result, have in themselves, usually been of a complicated nature so as not to serve their true purpose, or they were of such complexity of structure as to add greatly to the cost of the weighing mechanisms.

The principal object of this present invention is to provide a balancing attachment for the balance type of scales, which is simple in structure, so that it may be easily operated by an inexperienced or unattentive person, and which simplicity will permit the production of the equipment at a sufficiently low cost as to make it an item of real worth as an attachment for scales.

A further object of this invention is to provide a re-balancing attachment for scales wherein an endless tape can be easily zeroed with the index of a balance and then the same index can be employed to read directly the amount to be added or subtracted from the original weight.

A further object of this invention is to provide a re-balancing attachment for scales which is so constructed that in any of its various settings, the attachment does not affect the static balancing of the load being weighed.

A further object of this invention is to provide an attachment that can be easily installed on existing scales employing a balance beam.

Further objects, advantages and capabilities will be apparent from the description and disclosure in the drawings, or may be comprehended or are inherent in the device.

In the drawings throughout which like reference numerals designate like parts:

Figure 1 is a front elevational view of a balance beam having the attachment of this invention mounted thereon;

Figure 2 is a cross sectional view taken along the line 2—2 of Figure 1;

Figure 3 is a perspective view showing, in fragmentary form, and with parts broken away and sectioned, the mounting elements employed at one end of the scale for carrying tapes;

Figure 4 illustrates in sectional elevation a typical hopper arrangement as used in batch handling of commodities, and showing the type of scale with which this equipment is primarily adapted for use.

Referring more particularly to the disclosure in the drawings, the numeral 10 designates the beam of a conventional balance scale. This beam is a lever of the first order, having the usual knife edge fulcrum at 12 and the usual draft rod 14, which is connected to the beam by the stirrup 15, and which stirrup in turn engages a conventional knife edge bearing 16.

In Figure 1 a double beam has been shown in which a tare beam 18 is employed having the slide poise 20 mounted for movement thereon.

The upper or weighing beam 10 is conventional in itself, but has mounted upon it a vernier type beam 22, with the associated elements in the form of a slide poise employing a scale window 24 having the usual index 26.

To employ this present invention, a tape 30 is mounted for employment with the main weighing beam 10, and a second endless tape 32 is mounted for employment with the slide poise 34, mounted upon the vernier scale 22. The mounting of the endless tapes 30 and 32, will be best understood from a reference to Figures 2 and 3. At each end of the respective beams with which they are associated, tapes 30 and 32 are mounted on grooved rollers, as 36, which are provided with flanges on the ends thereof, in order to accurately center the tapes. Rollers 36 are adapted to revolve upon bearings 38, formed within the mounting bracket 40. Brackets 40, of which one is required at each end of the beams mounting tapes 30 and 32, are adjustably secured to either the main double beam, as illustrated in Figure 1, or to the upright portions of the large slide poise bearing the vernier tape 32.

In order that the tapes 30 and 32 can be made thin enough to pass around rollers 36, they are normally too thin to be self-supporting, consequently, a shield and guide, as 42, for the long tape 30 and 44 for tape 32, are provided. These guide ways, which back up the tape scales, as will be noted in Figure 3, also are provided with overhanging lip portions 46 and 47, so that the thin flexible tape will always be accurately positioned, and not subject to damage. It has further been found desirable, from the standpoint of keeping this attachment as an easily applied unit, to use shielding members 42 and 44 as spacing members for the supporting bracket 40. Thus, in applying the attachment to a scale, the upper and lower units are applied to the scale as a complete assembly, and with a very minimum of expense.

Tapes 30 and 32 are normally formed of tempered metal, which are braised or otherwise secured at their ends to form an endless tape. This is desirable from a standpoint of always maintaining an exact balance of mass, without regard to the placement of the graduated portions of the tape. Owing to the fact that the tape, in effect, is a band of uniform weights, any movement of the same merely causes it to change position, but the mass or balance of the same always remains constant. This construction provides an unused back portion of the tape, and this admits of graduation in the reverse order from that employed in the front, at any one time.

Having two scales on the same tape, and graduated in the opposite directions makes it possible to employ a single tape either for indicating a balance, after an amount has been subtracted from the initial weighed amount, or to indicate a balance when an amount has been added to the initial weighing. This is a great convenience in that the scales are always present, yet, the one not in use is well out of the way, so that no confusion can result, as might occur if an operator had two scales before him to choose from, and might, during a period of inattention, select the wrong scale.

It is necessary to have a convenient means for accurately positioning the tapes 30 and 32, and this is achieved without destroying balance, by having a stop lug stuck out of the tape, as at 50. When so arranged it will be apparent that no metal is actually lost, and the weights will not be changed. It is necessary, of course, that the overall lateral extent of lug 50 must be less than the space between lips 46 and 47, so there will be no interference.

Co-acting with lug 50 on the tape 30, and lug 52 on tape 32, are index arms 55 and 57. Arm 55 is secured to the main portion of the principal slide poise and arm 57 is similarly secured to the vernier slide poise 34. A preferred pivotal mounting of the arms is illustrated in Figure 2, in which an arcuate slot is provided at 60 in each of the arms for screws 61 so that the arms will be held fixedly in position as far as being movable by lugs 50, but on occasion when it is desired to reverse the tape, the arms can be raised sufficiently so as to pass over the lugs, and thus make in convenient to use either graduation on the tapes.

Now there may be many uses for an attachment of this order. It is particularly adapted for use with batch weighing hoppers, and finds its greatest use when an amount is withdrawn from the batch, or is added to the batch. A typical installation is illustrated in Figure 4, in which a batch hopper 66 is illustrated having a sloping bottom 68 communicating with a discharge pipe 70. Gates are normally provided to prevent the flow of material out of the hopper, except as desired, but this forms no part of this invention, and the same is not illustrated in detail. A supply tube is indicated at 72. The whole hopper is mounted upon a scale frame 74, on a conventional hopper scale. These are normally arranged with ball-bearings as at 76 to assure proper positioning and for the protection of the knife edges and their bearings in the handling of the loads. A lever system, indicated at 78, is provided which in turn is connected normally to the draft rod as 14, shown in Figure 1, so that the scale mechanism can, through a suitable intermediate mechanism, handle loads of normal capacity. Many times hopper scales of this order may be required to hold loads of 50 to 75 tons to which it may be desirable to make relatively small additions, or for some purposes, it may be desirable to remove a small amount of the load. This present attachment greatly facilitates the handling of small additions or subtractions from this loading as well as handling any fraction thereof during the preparation of a batch mix.

*Method of operation*

For a better understanding of the method in which this attachment is employed, reference is made to Figure 1. This scale is used in the ordinary manner in order to make an initial weight. This may involve the adjustment of the slide poise 20 on the tare beam 18 and then a setting of index 26 to the approximate desired weight, and then slide poise 34 on the vernier scale 22 is adjusted to bring beam 10 into balance and thus provide the accurate weighing of the hopper initially. The next action is to zero the movable tapes 30 and 32. This is accomplished by moving these tapes about their various sheaves 36 until lugs 50 and 52 abut the indicator arms 55 and 57 respectively. The scale operator now makes new settings of the main slide poise so as to bring index 55 in registry with the even hundreds of pounds he wants to subtract from the initial weighing, and likewise the vernier slide poise 34 is moved, so that indicator 57 will indicate on the vernier tape 32 the accurate poundage desired, as illustrated in Figure 1. Now it will be apparent that if the scale is in balance and the slide poises are both moved the scale will be thrown out of balance by the amount it is desired to withdraw from the hopper. The withdrawal is then made until the scale is again in balance, as will be indicated by pointer 80, on an appropriate scale.

In analyzing this operation, it will be apparent that the operator can only move his slide poises in one direction, otherwise he will encounter lugs 50 or 52, which will serve as a warning, and the attachment by means of the adjustable tape 30 and 32, has, in effect, provided a subtracting device, which involves no mental calculations, and thus, one of the serious difficulties, at present encountered in batch weighing is effectively overcome. In Figure 1 the poises were reset to provide for the subtracting of about 1570 pounds. It is believed apparent that, if it had been desired to add to the initial weighing, then the slide poises would, of necessity, have been moved in the reverse direction, index arms 55 and 57 being pivoted to pass lugs 50 and 52 and then being pivoted back to position on the right side of lugs 50, 52.

It is believed that it will be clearly apparent from the above description and the disclosure in the drawings that the invention comprehends a novel construction of a balancing attachment for weighing scales.

Having thus disclosed the invention, I claim:

1. In combination with a weighing scales having a main weighing beam, a main slide poise slidably positioned on said main beam to travel thereon, a vernier type beam mounted on said main slide poise and a vernier slide poise slidably mounted on said vernier type beam to travel thereon, balancing attachments, comprising: a first and a second pair of parallel elongated guide members, each having a pair of rollers, one mounted at each end of the pair of guide members; an endless flexible tape mounted on each of said pairs of rollers and riding on the outside of the associate guide members, said guide members having lips covering the edges of said endless tapes, said first pair of guide members being mounted on said main beam in parallel relationship thereto so that one run of its endless tape is positioned parallel to said main beam and said second pair of guide members being mounted on said vernier type beam in similar parallel relationship thereto, each endless tape having a portion cut on a U-shaped line and bent outward at right angles to the adjacent portions of the endless tape forming a stop lug and each endless tape having numbered graduations thereon of increasing denomination in opposite directions from its stop lug and said main poise having an arm mounted thereon and manually pivotal to swing transversely of said main beam from a position to engage the adjacent stop lug to a position out of the path of travel of the same and said vernier slide poise having a like pivotal arm coacting with the stop lug of the adjacent endless tape.

2. In combination with a weighing scales having a weighing beam and a slide poise slidably positioned on said weighing beam to travel on said beam, a balancing attachment, comprising: a pair of parallel elongated guide members having a pair of rollers, one mounted at each end of said pair of guide members; an endless flexible metal tape mounted on said rollers and riding on the outside of said guide members, said guide members having lips covering the edges of said endless tape, said guide members being mounted on said beam in parallel relationship thereto so that one run of said endless tape is positioned parallel to said beam, said endless tape having a portion cut on a U-shaped line and bent outward from said endless tape forming a stop lug and said endless tape having numbered graduations thereon of increasing denomination in opposite directions from said stop lug and said slide poise having an arm mounted thereon and manually pivotal to swing transversely of said beam from a position to engage said stop lug to a position out of the path of travel of the same.

3. In combination with a weighing scales having a weighing beam and a slide poise slidably positioned on said weighing beam to travel on said beam, a balancing attachment, comprising: and endless metal tape mounted on said beam and supported by the beam to move in a closed path a substantial part of which lies parallel to and adjacent to the path of travel of said poise, said endless tape having a portion cut on a U-shaped line and bent outward at right angles to the adjacent portions of said endless tape forming a stop lug and said endless tape having numbered graduations thereon of increasing denomination in opposite directions from said stop lug and said slide poise having an arm mounted thereon and manually pivotal to swing transversely of said beam from a position to engage said stop lug to a position out of the path of travel of the same.

4. In combination with a weighing scales having a main weighing beam, a main slide poise slidably positioned on said main beam to travel thereon, a vernier type beam mounted on said main slide poise and a vernier slide poise slidably mounted on said vernier type beam to travel thereon, separable balancing attachments, comprising: a first and a second pair of parallel, elongated, rigid guide members, each pair of guide members having a pair of rollers mounted one at each end of the paired guide members, an endless flexible tape mounted on each of said pairs of rollers and riding on the associated guide members, said first pair of guide members being mounted on said main beam in parallel relationship thereto so that one run of its endless tape is positioned parallel to said main beam and said second pair of guide members being mounted on said vernier type beam in similar parallel relationship thereto, each endless tape having a portion cut on a U-shaped line and bent outward at right angles to the adjacent portions of the endless tape forming a stop lug and each endless type having numbered graduations thereon of increasing denomination from its stop lug, and said main poise having an arm mounted thereon in position to engage the adjacent stop lug and said vernier slide poise having a like arm coacting with the other stop lug.

References Cited in the file of this patent

UNITED STATES PATENTS

| Number | Name | Date |
|---|---|---|
| 196,703 | Rider | Oct. 30, 1877 |
| 281,586 | Wailey | July 12, 1883 |
| 971,829 | Clausen | Oct. 4, 1910 |
| 1,180,277 | Attaway | Apr. 25, 1916 |
| 1,558,616 | Howard | Oct. 27, 1925 |
| 1,880,651 | Zinke | Oct. 4, 1932 |
| 2,205,606 | Nichols | Dec. 24, 1935 |